Feb. 13, 1940.  S. OLSON  2,190,336
CONVEYER ROLLER CONSTRUCTION
Filed June 22, 1936

Witness
N. T. McKnight.

Inventor.
Samuel Olson.
by [signature]
his Attorneys.

Patented Feb. 13, 1940

2,190,336

UNITED STATES PATENT OFFICE 2,190,336

CONVEYER ROLLER CONSTRUCTION

Samuel Olson, Chicago, Ill.

Application June 22, 1936, Serial No. 86,452

1 Claim. (Cl. 308—20)

This invention relates to conveyers, and particularly to the construction of the bearing rollers provided for carrying conveyer belts. One object of the invention is to provide a simple and substantial construction by which the bearings are securely mounted on the supporting frame structure. Another object is to provide a bearing which may be easily and reliably lubricated without waste of lubricant. And a further object of the invention is to connect the bearings to the supporting structure and to the rollers in a manner which permits the parts to be readily and conveniently disassembled for replacement or repair. The invention consists in certain features and elements of construction in combination, as herein shown and described and as indicated by the claim.

Figures 1, 2, 3:
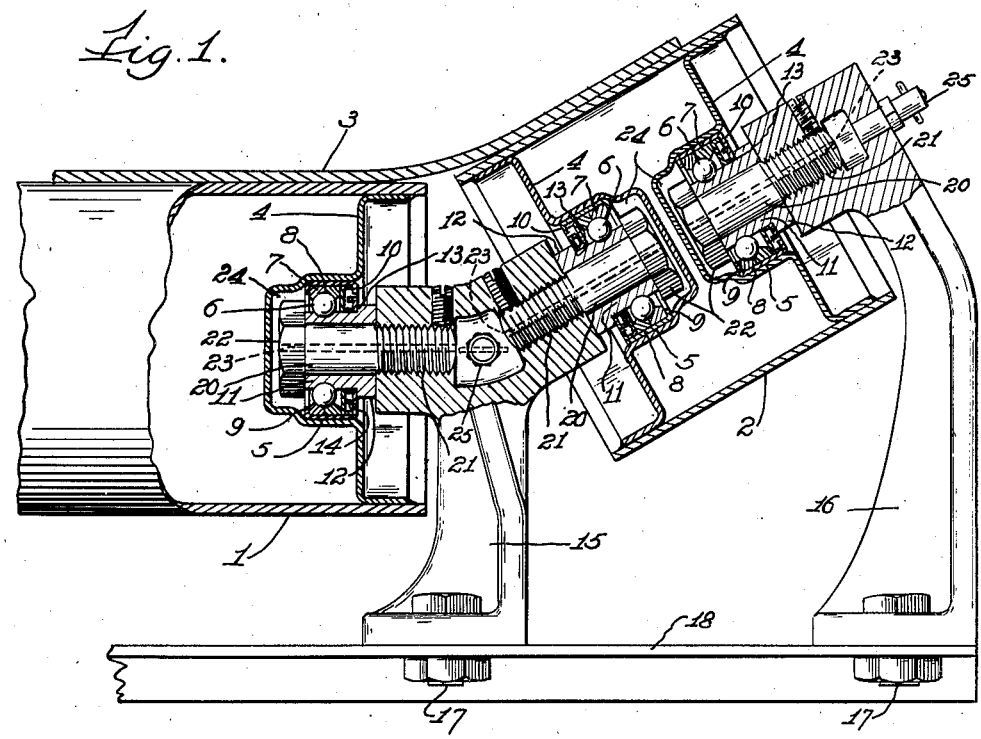
Figure 1 is a partial elevation with much of the structure shown in vertical section taken axially with respect to the rollers for illustrating various features of a bearing construction embodying this invention.
Figure 2 is an axial sectional view of a conveyer roller showing a modified bearing construction embodying the invention.
Figure 3 is a detail section taken as indicated at line 3—3 on Figure 2.

Referring first to the construction shown in Figure 1, it will be noted that the rollers 1 and 2, on which the conveyer belt 3 is carried, are formed of sections of cylindrical tubing, and their ends are closed by heads 4, which may be sheet metal stampings, and which include centrally disposed sockets or cavities 5 in which the ball bearing units are removably lodged. Each bearing unit includes a series of bearing balls 6 and an outer race 7, which is shown as composed of two parts providing a grooved raceway, together with an enclosing or retaining ring 8 into which the race members 7 are permanently fitted and secured as by flanges 9 and 10. The inner race is a sleeve 11, provided with a groove forming the raceway proper, and having a portion 12 of larger diameter at one end forming a shoulder 13 which serves to retain the annular members of a dust guard 14, of the labyrinth type, which occupies the space between the outer race member 7 and the end flange 10 of the ring 8.

In the particular type of conveyer chosen to illustrate this form of the invention the bearings are supported by brackets 15 and 16 secured by bolts 17 to any convenient part of the general frame structure, such as the cross member 18, and each bearing is held firmly to its supporting bracket by means of a cap screw 20. The threads 21 of the cap screw enter threaded bores in the bearing brackets, and the head 22 of each cap screw bears against the end of the sleeve 11, which constitutes the inner ball race and thus secures this member firmly against the bearing bracket. The bearing unit which is held together by the retaining ring 8 fits snugly into the socket portion 5 of the head 4. In setting up the structure shown in Figure 1, the brackets 15 and 16 may be left disconnected from the frame member 18 until the bearing units have been secured to the brackets by their respective screws 20, and then slipped into the sockets 5 in the ends of the rollers. Similarly, in disassembling the parts, the brackets will first be removed from the frame by loosening their fastening bolts 17.

Each of the screws 20 is formed with a duct 23 extending from end to end for conveying lubricant to the chamber 24 of the head 4 which accommodates the head portion 22 of the screw 20. From this chamber the lubricant is readily fed into the space between the inner and outer races of the bearing and onto the bearing balls 6. In the brackets 15 and 16 the threaded bores into which the screws 20 are secured, may be provided with any suitable passages communicating with the ducts 23; as shown, the brackets are fitted with coupling connections 25, adapted to receive a pressure lubricator for the injection of grease, thus ensuring that the lubricant will be forced through the ducts 23 into the chambers 24 and into the available space in the bearings themselves. At the same time, the chambers 24 are only enough larger than the heads 22 of the screws 20 to provide space for a reasonable supply of lubricant, which is completely separated from the larger cavity of the roller itself and thus avoids the wastage of lubricant within the roller cavity.

Figure 2 shows a slightly modified construction in which the supporting members are shown as channels 30 forming side frames of the conveyer structure. The roller 31 is a hollow tube with pressed sheet metal heads 32 closing its ends. The bearing units are of the same type as those illustrated in Figure 1, including bearing balls 6, with outer race-way members 7, retaining rings 8, and dust guards 10. The inner race 33 is a sleeve grooved to form a track for the bearing balls 6, but its axial bore is threaded for engagement with the threads 34 of the mounting screw 35. The enlarged portion 36 of the sleeve 33 provides a retaining shoulder for the dust guard members, and, in addition, it is made of non-circular outline—hexagonal, as illustrated—for engagement by a wrench in tightening the sleeve as a nut on the screw 35, so that the screw is rigidly secured in a frame member 30 by clamping engagement between its head 37 and the sleeve 33. Preferably, the head 36 of the sleeve includes a face 38 formed with radial grooves or notches 39 so that a split spring washer 40 inserted between the face 38 and the face of the frame 30 will engage one of these grooves 39 ratchet-fashion, to lock the sleeve firmly in position when it has been tightened on the screw 35. A second washer 41, which may be a lock washer, if desired, is shown between the head 37 of the screw and the frame member 30.

As in the structure of Figure 1, the bearing unit is snugly fitted into a socket 42 formed in the head 32 of the roller, and the inner end portion of the socket 42 provides a chamber 43 for the lubricant which may be introduced through an axial duct 44 in the screw 35. The head 32 may be a forced fit in the end of the tubular roller 31, and at intervals the roller may be upset inwardly, as indicated at 45, to provide stop shoulders against which the rim flange 46 of the head may be lodged. These heads may then be permanently fixed by spinning over the ends of the roller tube 31, as shown at 47. This construction provides the same advantages as to economical lubrication as the arrangement shown in Figure 1. In addition, it permits disassembly of any individual roller and its bearings without any disturbance of the supporting structure, since the screw 35 may be readily backed out and unscrewed from the inner bearing sleeve 33, and when this has been done at both ends of the roller 31, the roller may be lifted out from between the side frames 30. Since the ball bearing units are only retained frictionally in the sockets 42, they may be withdrawn quite readily for inspection or repair. And the fact that the mounting bolt 29 or 35 is a separate element from the inner ball race, permits the bolt to be withdrawn from the race without disassembling the bearing unit itself, or releasing the balls from it, and this is an important convenience in taking down the structure or installing a new bearing.

While there is shown and described herein certain specific structure embodying the invention, it will be manifest to those skilled in the art that various modifications and rearrangements of the parts may be made without departing from the spirit and the scope of the invention, and that the same is not limited to the particular form herein shown and described, except in so far as indicated by the appended claim.

I claim:

In combination with a conveyer roller, a head for the roller closing its cavity and formed with a central socket, a bearing unit comprising an outer bearing race, an inner bearing race, a plurality of rolling members between the races, said unit being frictionally secured in the socket, the inner race having a threaded bore, a bearing support and a screw in said support disposed with its threads engaging the bore of the inner race for clamping it to the support, the outwardly disposed end of said inner race having radial notches, and a split spring washer disposed between said notched end of the race and support engaged with one of the notches for locking the bearing member against rotation.

SAMUEL OLSON.